July 5, 1938.  B. HULSKAMP  2,122,523
DEVICE FOR SEVERING MEASURED PORTIONS FROM A BAR OF ICE CREAM
Filed April 24, 1936
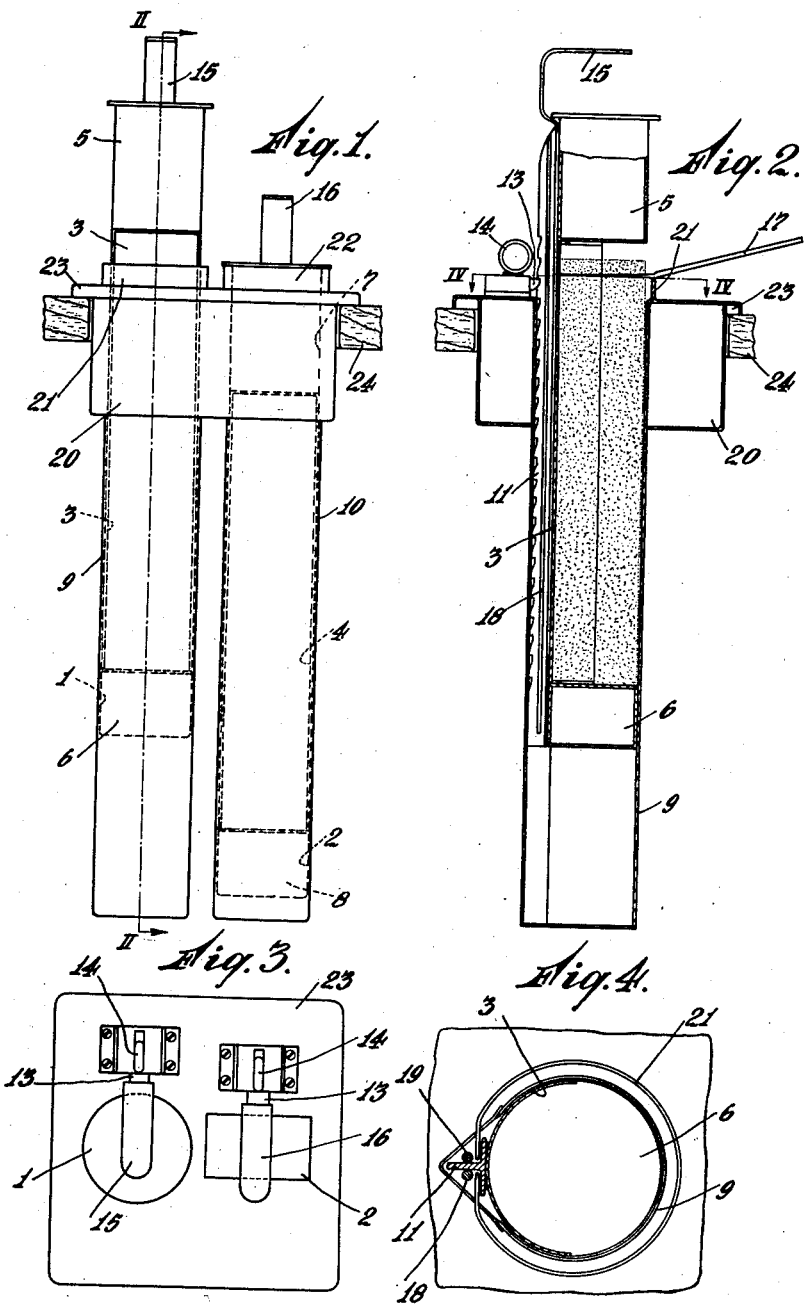

Patented July 5, 1938

2,122,523

UNITED STATES PATENT OFFICE 2,122,523

DEVICE FOR SEVERING MEASURED PORTIONS FROM A BAR OF ICE CREAM

Bernardus Hulskamp, Alkmaar, Netherlands

Application April 24, 1936, Serial No. 76,290
In the Netherlands April 25, 1935

2 Claims. (Cl. 107—21)

When dispensing ice cream or similar frozen dainties, the vender generally deposits a measured serving of the same into a container or upon a wafer by means of a spatula. Bulk ice cream, however, has the property of being very compressible, so that when pressing the same into a container or upon a wafer, the vender generally delivers portions of greatly varied sizes.

In order to obviate this drawback, it has already been proposed to press the ice cream upwardly out of a cylindrical container and then to sever a layer of the desired volume from the frozen ice cream emerging above the container edge.

Although this manner of severing the ice cream will prevent the losses caused by the compression of the same when pressed down into a receptacle or upon a wafer, it is not possible on account of the softness of the material to prevent when using the above mentioned device, that the slice of ice cream is deformed into an unsightly shape during the severing action.

The present invention has for its purpose to produce a device with the aid of which it is possible to sever slices of a desired thickness from a rod or bar of bulk ice cream or similar frozen dainties in such a way that the severed slice will practically completely retain the cross-section of the bar or rod of bulk material.

For this purpose the device according to the invention comprises a cylindrical casing within which a holder for the rod or bar of ice cream is adapted to reciprocate, the said holder consisting of an upper and a lower bounding surface, which bounding surfaces are interconnected by a vertical wall which is intended to serve as a support for the severing of the slices of ice cream.

The invention is further explained with the aid of the accompanying drawing, in which—

Fig. 1 is a front view of a device according to the invention.

Fig. 2 is a longitudinal section according to the line II—II in Fig. 1.

Fig. 3 is a plan view and

Fig. 4 is a cross section on an enlarged scale according to the line IV—IV in Fig. 2.

In the embodiment illustrated in the drawing the device according to the invention is provided with two bar or rod holders 1 and 2, each comprising a supporting wall denoted as 3 and 4 respectively.

As shown in Fig. 4, the supporting wall 3 is semi-circular in cross section and is used to support a bar of ice cream of circular cross section adapted to be cut into slices to be deposited between two circular wafers. The diameter of wall 3 substantially corresponds with the inner diameter of the receptacle 1. The second supporting wall 4 is plane, i. e. rectilinear in cross section and is used to support a bar of ice cream of rectangular cross section adapted to be cut into slices to be deposited between two rectangular wafers. The width of wall 4 substantially corresponds with an inside dimension of the receptacle 2 and is equal to the length of one of the wafer sides. The supporting walls 3 and 4 respectively are connected at their tops and at their bottoms with bounding members 5 and 6, and 7 and 8 respectively, which bounding members determine the maximum length of the bar or rod of bulk ice cream and in the present case are made in the shape of boxes. The bar or rod of frozen cream or the like consequently will be located against the supporting wall 3 or 4 and between the bounding members 5 and 6 or 7 and 8 at the upper and lower ends of the said walls 3 and 4, the bulk ice cream not being wrapped up.

The lower bounding members 6, 8 constitute platforms for supporting the ice cream bars. The holders 1, 2 are each adapted to be moved up and down in tubular casings 9, 10 respectively provided in the refrigerating space of an ice cream vender's cart. The casings 9, 10 are open at their upper ends, and are closed by the upper bounding members 5, 7. It will be clear from what has been said above regarding the shape of holders 1, 2 and supporting walls 3, 4, that the casing 9 which receives holder 1 is of cylindrical cross section, while casing 10 which receives holder 2 is of rectangular cross section. If the holders are in their lowest position, the bulk ice cream will be subjected to the action of a refrigerant. Each container 1 and 2 respectively is provided in a longitudinal direction with a toothed rack 11 (Fig. 2) co-operating with a resilient pawl tooth 13 which may be brought out of engagement with its toothed rack by means of an eye 14 against the action of the spring. The holders 1 and 2 are each provided at the top with a hook-shaped handle 15 and 16 respectively by means of which they may be pulled upwards out of their casings. The toothed rack is constructed so that the distance between two consecutive teeth is equal to the thickness of one filling.

In operation, the desired holder 1 or 2 (depending on whether slices of circular or rectangular cross section are required) is pulled by its handle 15 or 16 upwardly through the open upper end of the respective tubular casing 9 or 10. The holder may be pulled upwardly the distance of a single rack tooth if a single thickness slice is to be cut or the distance of two rack teeth if a double thickness slice is to be cut. The portion of ice cream projecting above the upper end of the holder is then severed with the aid of spatula 17. A covering wafer is then placed upon the cut portion or slice, the dainty thus formed is turned over, after which a second wafer is placed upon the filling and the whole is ready for delivery. After the slice has been cut, the respective eye 14 is actuated to disengage the pawl tooth 13 from rack 11 and the holder, together with the remaining part of the bar of ice cream, is pushed back into the casing.

It will be seen that the supporting walls 3, 4 move with the ice cream bars and thus constitute a supporting surface for the bars not only when the bars are in lowered position but also while the bars are being moved upwardly and during the severing operation, protecting the bars from deformation at these times. It will further be seen that the top bounding member 5 or 7, in the form of a box and having insulating properties, moves as a unit with the ice cream bar and back supporting wall. Thus only a single action or movement is necessary to open the receptacle and raise the bar. Similarly, by a single movement, the bar can be lowered and the top opening of the receptacle closed by the box whereby the time during which heat leakage into the receptacle may occur is relatively short.

The upward and downward sliding movement of the holder is guided by means of guide bars 18, 19, secured to the holders. The casings 9, 10 are mounted at their tops into a box or case 20 provided with upstanding edges or collars 21, 22 bounding the entrances and with a ledge 23, provided at the circumference of the said box 20, by means of which it is suspended in an opening of a support 24.

The cart provided with the above device may contain a supply of bulk ice cream in metal holders. The said ice cream need not be wrapped up. It would also be possible to carry a supply of bulk ice cream bars wrapped in paper.

The members 5 and 6, respectively 7 and 8 and the case 20 may be filled with an insulating material.

The upper bounding surfaces 5 and 7 respectively of the holders may be fixedly or detachably attached to the supporting walls 3 and 4 respectively and in the latter case they are handled as a detachable cover for closing the open upper end of the casings 9 and 10 respectively.

I claim:

1. A device for dispensing measured slices from a bar of ice cream and similar frozen dainties, comprising a vertical elongated receptacle, a platform vertically reciprocable within said receptacle, a vertical wall having a width that substantially corresponds to one-half the cross sectional periphery of said receptacle, the lower end of said wall being fixed to the said platform and the upper end being provided with a cover for the receptacle.

2. A device for dispensing measured slices from a bar of ice cream and similar frozen dainties, comprising an elongated receptacle, a platform reciprocable within said receptacle, a supporting wall having a width that substantially corresponds to one-fourth the cross sectional periphery of said receptacle, the inner end of said supporting wall being fixed to the said platform and the outer end being provided with a cover for the receptacle.

BERNARDUS HULSKAMP.